United States Patent [19]

Haendle

[11] Patent Number: 5,170,425
[45] Date of Patent: Dec. 8, 1992

[54] X-RAY DIAGNOSTICS INSTALLATION HAVING A PRIMARY RADIATION DIAPHRAGM

[75] Inventor: Joerg Haendle, Erlangen, Fed. Rep. of Germany

[73] Assignee: Siemens Aktiengesellschaft, Munich, Fed. Rep. of Germany

[21] Appl. No.: 831,503

[22] Filed: Feb. 5, 1992

[30] Foreign Application Priority Data

Mar. 1, 1991 [EP] European Pat. Off. ............ 91103099

[51] Int. Cl.$^5$ ............................................. G21K 1/04
[52] U.S. Cl. .................... 378/151; 378/145; 378/19; 378/150
[58] Field of Search ............... 378/145, 19, 99, 151, 378/160, 148, 150, 152, 153

[56] References Cited

U.S. PATENT DOCUMENTS

| | | | |
|---|---|---|---|
| 4,360,731 | 11/1982 | Fink et al. | 378/99 |
| 4,442,538 | 4/1984 | Haendle | 378/146 |
| 4,473,843 | 9/1984 | Bishop et al. | 378/99 |
| 4,831,260 | 5/1989 | DiBianca | 378/151 |
| 4,935,946 | 6/1990 | Hefter et al. | 378/151 |
| 4,947,416 | 8/1990 | McFaul et al. | 378/150 |

FOREIGN PATENT DOCUMENTS 0114369 3/1984 European Pat. Off. .
0402876 12/1990 European Pat. Off. .
1800879 1/1974 Fed. Rep. of Germany .

Primary Examiner—Janice A. Howell
Assistant Examiner—Don Wong

[57] ABSTRACT

An x-ray diagnostics installation has a primary radiation diaphragm disposed in the beam path of an x-ray tube, with the x-rays attenuated by an examination subject being processed through an image intensifier video chain, which includes an image memory. The primary radiation diaphragm is provided with sensors which generate an electrical signal corresponding to the position of the individual diaphragm components of the primary radiation diaphragm, these signals being supplied to a processing stage in the image intensifier video chain. The processing stage acts on the data stored in the image memory so that the effect of the diaphragm can be simulated, and included in the displayed image. The processing stage includes a control computer connected to the sensors, and a simulation circuit for simulating the effect of the primary radiation diaphragm.

6 Claims, 1 Drawing Sheet

3
X-RAY DIAGNOSTICS INSTALLATION HAVING A PRIMARY RADIATION DIAPHRAGM

BACKGROUND OF THE INVENTION

1. Field of the Invention

The present invention is directed to an x-ray diagnostics installation having a primary radiation diaphragm disposed in the beam path of an x-ray tube, wherein the x-rays attenuated by an examination subject are processed by an image intensifier video chain which includes an image memory.

2. Description of the Prior Art

Primary radiation diaphragms are used in x-ray diagnostics installations to blank portions of the radiation image for reducing stray radiation and for reducing the image brightness. Various types of primary radiation diaphragms are known, such as contour diaphragms, semi-transparent contour diaphragms, finger diaphragms having specific profile absorptions adapted to the subject, etc.

A primary radiation diaphragm is disclosed in German Patent 1 800 879 for use in x-ray examination equipment, the primary radiation diaphragm being formed by two semitransparent diaphragm plates. These diaphragm plates can be adjusted in the transillumination image with operating elements, until they assume a desired position. As a result, however, the attending personnel as well as the examination subject are exposed to undesired, additional radiation because the adjustment of the diaphragm does not form a part of the actual diagnostic exposure.

SUMMARY OF THE INVENTION

It is an object of the present invention to provide an x-ray diagnostics installation having a primary radiation diaphragm disposed in the beam path of an x-ray tube wherein it is possible to achieve an optimum setting of the diaphragm without an additional radiation load.

The above object is achieved in accordance with the principles of the present invention in an x-ray diagnostics installation having a primary radiation diaphragm which is provided with sensors which supply an electrical signal corresponding to the position of the individual data parts of the diaphragm to a processing stage. The processing stage acts on the data signals stored on the image memory so that the effect of the primary radiation diaphragm on the stored image is simulated, so that the simulated diaphragm effect can be displayed in the image on a monitor. A simulation of the diaphragm by transparency matching in the displayed image with an absorption matching read-out from the image store can be obtained.

A simple structure is obtained in an embodiment wherein the processing stage includes a control computer connected to the sensors, and a simulation circuit connected to the image memory for simulating the effect of the primary radiation diaphragm. The control computer calculates the position and coordinates of the individual diaphragm parts from the sensor signals, and causes an attenuation of the video signal in the region of the diaphragm part in accord with the amount of attenuation which that diaphragm part contributes to the x-ray image.

Preferably the simulation circuit includes a circuit for amplitude matching of the video signal, with the absorption factors of the primary radiation diaphragm causing a corresponding attenuation of the video signal.

A complete blanking of the image portions attenuated by the diaphragm plates of the primary radiation diaphragm can be achieved if the simulation circuit includes a blanking circuit, which effects a blanking of the video signal in that region of the overall image in registry with the diaphragm plate, so that no video signal at all appears in that region in the displayed image.

The absorption behavior of semi-transparent diaphragm plates can be achieved by including a logarithmizing circuit at the input to the simulation circuit, and a delogarithmizing at the output of the simulation circuit. A precise amplitude reduction in the video signal domain can be implemented even in the case of superimposed diaphragm lamellae.

It has proven advantageous to supply the output of the simulation circuit to a summing circuit to which the output signal from a further blanking circuit is supplied, the further blanking circuit also being connected to the image memory and to the control computer. The further blanking circuit operates generally in a complementary manner to the blanking or attenuation which takes place in the simulation circuit, so that the signal outside the region of the primary radiation diaphragm can be supplied unattenuated by the further blanking circuit to the summing circuit, with the simulation circuit supplying only that part of the total image which is within the region of the primary radiation diaphragm.

DESCRIPTION OF THE PREFERRED EMBODIMENTS

Figure 1:
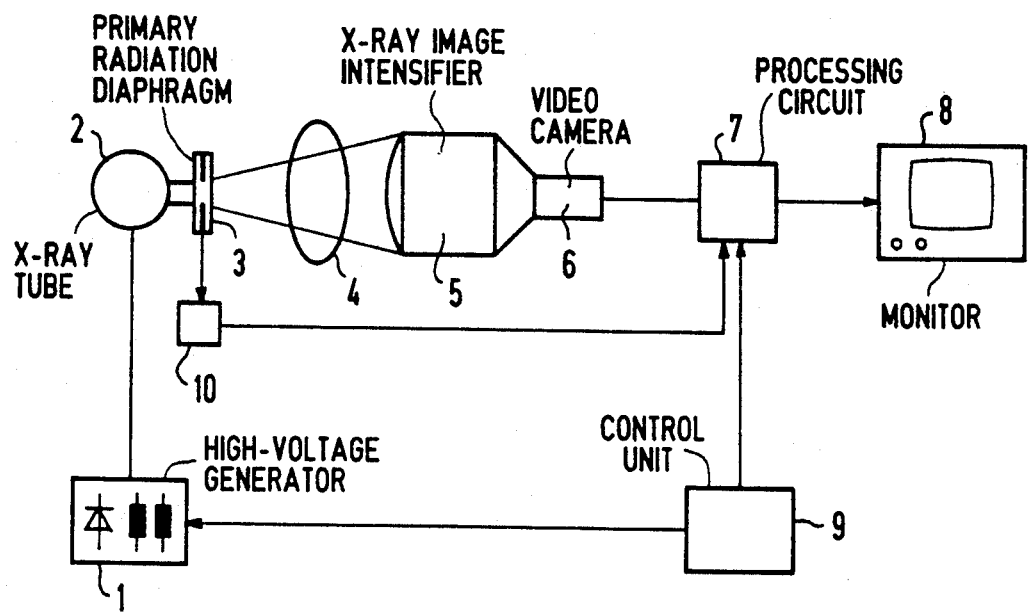
FIG. 1 is a schematic block diagram of an x-ray diagnostics installation with a primary radiation diaphragm constructed in accordance with the principles of the present invention.

An x-ray diagnostics installation constructed in accordance with the principles of the present invention is shown in FIG. 1, which includes a high-voltage generator 1 which feeds an x-ray tube 2 equipped with a primary radiation diaphragm 3 disposed in the beam path of the x-ray tube 2. An examination subject 4 is situated in the beam path as limited by the primary radiation diaphragm 3. The x-rays generated by the x-ray tube 2 which are attenuated by the patient 4 are incident on the input window of an x-ray image intensifier 5. The incident radiation image, intensified by the x-ray image intensifier 5, is reproduced on the output luminescent screen thereof as a visible image. This image is acquired by a video camera 6 via an optics system (not shown) and is converted into a video signal. The video camera 6 is connected via a processing circuit 7 to a monitor 8 for displaying the video signal. A control unit 9 synchronizes the operation of the various components of the installation.

In accordance with the invention, the primary radiation diaphragm 3 is connected to one or more sensors 10, which acquire the position of the beam-blocking and/or beam-attenuation parts (i.e., plates, leaves, lamellae, etc.) of the primary radiation diaphragm 3. The sensors 10 generate electrical signals corresponding to the position of these parts of the primary radiation diaphragm 3, which are supplied to the processing circuit 7. On the basis of the position of the parts of the diaphragm 3, the processing circuit 7, as described below, calculates the attenuation of the radiation image caused by the primary radiation diaphragm 3, and this is correspondingly taken into consideration in the reproduced image on the monitor 8.

Figure 2:
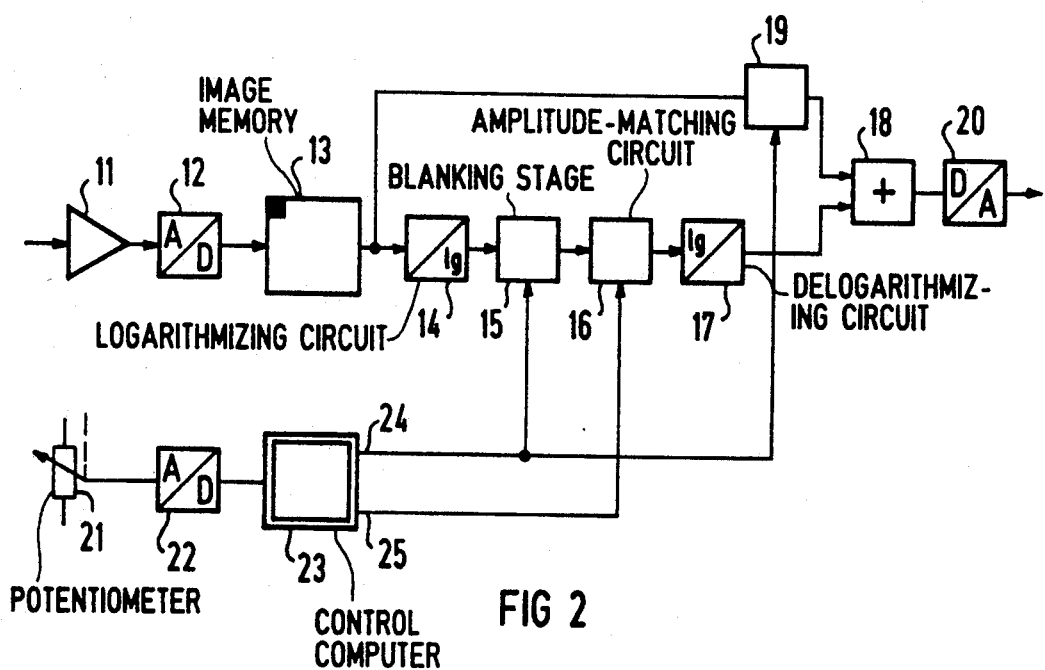
FIG. 2 is a schematic block diagram showing details of the processing circuit of the installation of FIG. 1.

Details of the processing circuit 7 are shown in FIG. 2. The output signal of the video camera 6 is supplied to a video amplifier 11 and is then digitized in an analog-to-digital converter 12 connected to the output of the video amplifier 11, and the digital signals are entered into an image memory 13. The output of the image memory 13 is connected to a logarithmizing circuit 14, which generates an output signal which is supplied to a first blanking stage 15. An amplitude-matching circuit 16 is connected to the first blanking stage 15, having an output connected to a delogarithmizing circuit 17. The output signal of the image memory 13 is also supplied to a second blanking stage 19. The output of the second blanking stage 19 is superimposed with the output signal of the delogarithmizing circuit 17 in a summing stage 18. The output of the summing stage 18 is supplied to a digital-to-analog converter 20. The analog output signal of the converter 20 is reproduced on the monitor 8.

As shown in FIG. 1, the sensors 10 generate a signal corresponding to the position of the components of the primary radiation diaphragm 3, which interact with the x-ray beam, such as to completely blank the beam or attenuate the beam. The sensors 10 may, for example, each be in the form of a potentiometer 21 which generates an analog voltage proportional to the position of the diaphragm part, this analog signal being supplied to an analog-to-digital converter connected to a process control computer 23. Data corresponding to the degree of absorption and to the shape of each beam-interacting part of the primary radiation diaphragm 3 are stored in the control computer 23. On the basis of the position signals of the beam-interacting parts of the diaphragm 3 supplied by the sensors 10 to the control computer 23, the control computer 23 calculates, for each picture element, whether this picture element is covered by a beam-interacting part, and the extent of the attenuation of this picture element by that beam-interacting part.

On the basis of these calculations, the control computer 23 produces blanking signals which correspond to the diaphragm contour and diaphragm position. These blanking signals are supplied via a first output 24 to the two blanking stages 15 and 19 which effect a corresponding blanking of their respective input signals. The control computer 23 generates a signal at a second output 25 which corresponds to the absorption factor of the beam-interacting parts of the primary radiation diaphragm 3 at the corresponding location in the video signal.

Inverse signals are thereby supplied to the two blanking stages 15 and 19. When the video signal conducted through the first blanking stage 15 is blanked, the video signal conducted through the second blanking stage 19 will be supplied unblanked to the summing circuit 18. If, by contrast, a portion of the video signal which would be affected by one of the beam-interacting parts of the diaphragm is read from the image memory 13, the video signal conducted through the second blanking stage 19 will be blanked, whereas the first blanking stage 15 allows the video signal to pass, so that it can be attenuated in the circuit 16 for amplitude matching in accordance with the absorption factor of the particular beam-interacting part.

By employing a specific depth diaphragm as the primary radiation diaphragm 3 at the x-ray tube 2 having localization sensors for the various beam-interacting parts of the diaphragm 3, a signal is obtained which the control computer 23 converts into blanking and absorption signals. A plurality of beam-interacting parts can thereby be entirely or partially mechanically superimposed, so that an absorption compensation for different subject dynamics is possible. By means of the control computer 23 and the simulation circuit formed by components 14, 15, 16, 17, 18 and 19, the beam matching in the video signal is simulated dependent on the diaphragms which have been introduced in the stored signal, so that all diaphragm manipulations can take affect in the stored video image.

The coordinate signals of the diaphragm setting are supplied by the sensors 10 to the primary radiation diaphragm 3. The absorption factors, or the blanked field, are edited for gating or attenuating the video signal via the control computer 23, wherein diaphragm thickness and contours are stored.

The absorption behavior of the semi-transparent diaphragms is simulated by logarithmizing the video signal. For identical semi-transparent diaphragm parts which are superimposed having the same transmission factors, the amplitude reduction is thus implemented in the video signal domain which is covered by those diaphragm parts, for example, after logarithmization of the video signal.

On the basis of the above-described circuitry, the primary radiation diaphragm 3 can be set in a desired manner after an overview exposure has been undertaken and without an additional radiation load, so that either another exposure or manipulations of the patient can be subsequently immediately implemented.

Although modifications and changes may be suggested by those skilled in the art, it is the intention of the inventor to embody within the patent warranted hereon all changes and modifications as reasonably and properly come within the scope of his contribution to the art.

We claim as our invention:

1. An x-ray diagnostics installation comprising: an x-ray tube which generates an x-ray beam in beam path;
   a primary radiation diaphragm disposed in said beam path and having a plurality of beam-interacting elements;
   an x-ray image intensifier video chain means for processing an image of an examination subject which attenuates said x-ray beam and for producing a visible image of said x-ray image on a display, said image intensifier video chain including an image memory;
   a plurality of sensor means for generating electrical signals corresponding to the respective positions of said beam-interacting elements of said primary radiation diaphragm; and
   processing means connected to said image intensifier video chain means and to said sensors for acting on signals stored in said image memory for simulating the effect of said beam-interacting elements on said x-ray beam.

2. An x-ray diagnostics installation as claimed in claim 1 wherein said processing means includes a control computer connected to said sensor means and simulation means connected to said image memory and to said control computer for simulating the effect of said primary radiation diaphragm.

3. An x-ray diagnostics installation as claimed in claim 2 wherein said image intensifier video chain means generates a video signal, wherein said beam-interacting elements of said primary radiation diaphragm have respective beam absorption factors, and wherein said simulation circuit includes means for amplitude-matching of the video signals for attenuating said video signal to an extent corresponding to the absorption factors of said beam-interacting elements.

4. An x-ray diagnostics installation as claimed in claim 2 wherein said image intensifier video chain means generates a video signal, and wherein at least one of said beam-interacting elements blocks a portion of said x-ray beam, and wherein said simulation circuit includes blanking circuit means for blanking a portion of said video signal corresponding to the position of said beam-interacting element which blocks said x-ray beam.

5. An x-ray diagnostics installation as claimed in claim 2 wherein said image intensifier video chain means generates a video signal, and wherein said simulation means includes means at an input of said simulation means for logarithmizing said video signal to produce a delogarithmized signal and means at an output of said simulation means for delogarithmizing said logarithmized signal.

6. An x-ray diagnostics installation as claimed in claim 2 further comprising:

blanking circuit means connected to said image memory and to said control computer for generating blanking signals corresponding to at least one of the contour, position or transparency of said beam-interacting elements of said primary radiation diaphragm for correspondingly blanking the signals stored in said image memory; and summing means, to which an output of said blanking means and an output of said simulation means are supplied for adding said outputs and thereby superimposing the output of said blanking circuit means on the output of said simulation means.

* * * * *